United States Patent
Ke

(10) Patent No.: US 11,459,435 B2
(45) Date of Patent: Oct. 4, 2022

(54) COMPOSITE FILM AND PREPARATION METHOD THEREOF

(71) Applicant: WUHAN CHINA STAR OPTOELECTRONICS SEMICONDUCTOR DISPLAY TECHNOLOGY CO., LTD., Wuhan (CN)

(72) Inventor: Linbo Ke, Wuhan (CN)

( * ) Notice: Subject to any disclaimer, the term of this patent is extended or adjusted under 35 U.S.C. 154(b) by 686 days.

(21) Appl. No.: 16/336,116

(22) PCT Filed: Mar. 18, 2019

(86) PCT No.: PCT/CN2019/078504
§ 371 (c)(1),
(2) Date: Mar. 25, 2019

(87) PCT Pub. No.: WO2020/124824
PCT Pub. Date: Jun. 25, 2020

(65) Prior Publication Data
US 2021/0371616 A1 Dec. 2, 2021

(30) Foreign Application Priority Data
Dec. 20, 2018 (CN) .......................... 201811562824.2

(51) Int. Cl.
| | | |
|---|---|---|
| *C08J 5/18* | (2006.01) | |
| *C08J 7/06* | (2006.01) | |
| *B29C 41/00* | (2006.01) | |
| *B29C 41/22* | (2006.01) | |
| *B29C 41/46* | (2006.01) | |
| *C08K 3/36* | (2006.01) | |
| *B29K 79/00* | (2006.01) | |
| *B29L 7/00* | (2006.01) | |
| *B29L 9/00* | (2006.01) | |

(52) U.S. Cl.
CPC .............. *C08J 7/06* (2013.01); *B29C 41/003* (2013.01); *B29C 41/22* (2013.01); *B29C 41/46* (2013.01); *C08J 5/18* (2013.01); *C08K 3/36* (2013.01); *B29K 2079/08* (2013.01); *B29L 2007/008* (2013.01); *B29L 2009/00* (2013.01); *C08J 2379/08* (2013.01); *C08K 2201/002* (2013.01)

(58) Field of Classification Search
CPC ... C23C 16/402; H01J 2237/3321; C08J 5/18; C08J 7/06; C08K 3/36
See application file for complete search history.

(56) References Cited

U.S. PATENT DOCUMENTS

| | | |
|---|---|---|
| 2002/0195197 A1 | 12/2002 | Egitto et al. |
| 2005/0048297 A1 | 3/2005 | Fukuda et al. |
| 2005/0195065 A1 | 9/2005 | Imai et al. |
| 2010/0209148 A1 | 8/2010 | Hiramoto et al. |
| 2018/0355172 A1 | 12/2018 | Uno |

FOREIGN PATENT DOCUMENTS

| | | |
|---|---|---|
| CN | 1290943 A | 4/2001 |
| CN | 1592540 A | 3/2005 |
| CN | 1775901 A | 5/2006 |
| CN | 101407589 A | 4/2009 |
| CN | 103917364 A | 7/2014 |
| CN | 103981634 A | 8/2014 |
| CN | 104851844 A | 8/2015 |
| CN | 108291088 A | 7/2018 |
| CN | 108774333 A | 11/2018 |
| CN | 108909118 A | 11/2018 |
| CN | 109021565 A | 12/2018 |

OTHER PUBLICATIONS

Neogi et al High-Temperature Oxidation Resistance of SiO2-Coated Polyimide Composite, AIChE Journal, vol. 38, No. 9 pp. 1379-1384, published on Sep. 1992.*
Zimcik et al Evaluation of plasma-deposited protective coatings for multipurpose space applications, Surface and Coatings Technology, vols. 39-40, Part 2, pp. 617-626, published on Dec. 15, 1989.*
Qi et al (CN 108774333), published on Nov. 2018.*

* cited by examiner

*Primary Examiner* — Gregory Listvoyb
(74) *Attorney, Agent, or Firm* — JMB Davis Ben-David

(57) ABSTRACT

The present invention provides a composite film and a preparation method thereof. The composite film includes polyimide and a dense silica layer formed on a surface of the polyimide.

3 Claims, 1 Drawing Sheet

COMPOSITE FILM AND PREPARATION METHOD THEREOF

CROSS-REFERENCE TO RELATED APPLICATIONS

This is the U.S. National Stage of International Patent Application No. PCT/CN2019/078504, filed Mar. 18, 2019, which in turn claims the benefit of Chinese Patent Application No. 201811562824.2 filed Dec. 20, 2018.

BACKGROUND OF INVENTION

Field of Invention

The present invention relates to the field of display panel technologies, and in particular, to a composite film and a method for preparing the same, wherein the composite film can be applied to a display panel as a flexible substrate.

Description of Prior Art

With rapid development of modern display technology, the display technology field is devoted to making displays lighter, thinner, softer, and more transparent. It is difficult to make conventional glass substrates meet the requirements of future flexible display technologies due to their hard and brittle characteristics. A polymer thin film substrate has the characteristics of light weight, flexibility, and excellent comprehensive performance, and can well meet the flexibility requirements of the display technology. Therefore, flexible polymer substrate materials are the preferred materials for future flexible display technologies.

Polyimide is the most promising polymer material for making flexible substrates because of its excellent heat resistance, radiation resistance, chemical resistance, electrical insulation, and mechanical properties. However, the substrates made of polyimide have a problem of poor water blocking ability and oxygen barrier capability.

In general, in order to solve the problem of the poor water blocking ability and the oxygen barrier capability of the polyimide flexible substrates, a structure in which a single layer or a plurality of stacked inorganic thin films are deposited on a surface of the polyimide flexible substrates is employed, or a structure in which a plurality of polyimide/inorganic thin films alternately stacked is employed.

The above multilayered stacked structure has a problem of a cumbersome preparation process. In addition, the flexible substrate of the multi-layered stacked structure also has problems such as an increase in internal stress, stress concentration, and breakage of an inorganic layer when it is bent.

Therefore, there is a need for a new material for preparing a flexible substrate to solve the above problems.

SUMMARY OF INVENTION

An object of the present invention is to provide a composite film including a base substrate and a dense silica layer disposed on a surface of the base substrate. More specifically, the composite film provided by the present invention is a polyimide-silica (PI-$SiO_2$) composite film layer, which is different from the conventional polyimide substrate used in the prior art. The composite film improves the water-blocking and oxygen barrier properties of the polyimide through the dense silica film while maintaining the original excellent performance of the polyimide film. In addition, the dense silica layer has a regular network structure formed by thermal decomposition of polysiloxane during thermal imidization of polyamic acid at a high temperature, and thus problems such as an increase in internal stress caused by surface deposition of an inorganic thin film and breakage of an inorganic layer when it is bent can be avoided at the same time.

In order to achieve the above object, the present invention provides a composite film including a polyimide film and a dense silica layer formed on a surface of the polyimide film. The dense silica layer has a density ranging from 2 $g/cm^3$ to 3 $g/cm^3$, and a thickness ranging from 10 to 500 nm.

The present invention also provides a composite film including a base substrate and a dense silica layer disposed on a surface of the base substrate.

In an embodiment, the dense silica layer has a density ranging from 2 $g/cm^3$ to 3 $g/cm^3$.

In an embodiment, the composite film has a thickness ranging from 50 to 300 μm, and the dense silica layer has a thickness ranging from 10 to 500 nm.

The present invention also provides a method for preparing the above composite film, including: providing a support substrate; coating a composite solution on the support substrate, and baking the composite solution at a low temperature to remove an organic solvent thereof to obtain a thin film layer, wherein the composite solution comprises a solution of polyamic acid and a solution of polysiloxane; heating the thin film layer to cause imidization of the polyamic acid and hydrolysis of the polysiloxane to obtain a polyimide-silica composite film; and peeling off the support substrate to obtain the composite film.

In an embodiment, a molar ratio of the polyamic acid solution to the polysiloxane solution in the composite solution is in a range of 1:0.1-0.2

In an embodiment, the polyamic acid solution is obtained by a polycondensation reaction of a dianhydride and a diamine at a low temperature in a first solvent, and a molar ratio of the dianhydride to the diamine is 1:0.95-1.05

In an embodiment, the dianhydride is at least one of pyromellitic dianhydride, cyclobutane tetracarboxylic dianhydride, benzophenone tetracarboxylic dianhydride, and pyromellitic phthalic anhydride, 4,4'-oxophthalic anhydride; and, the diamine is at least one of 4,4'-biphenyldiamine, 3,4'-diaminodiphenyl ether, and p-phenylenediamine.

In an embodiment, the polysiloxane solution is obtained by a hydrolysis condensation reaction of an alkoxysilane in a second solvent using a catalyst.

In an embodiment, the alkoxysilane is at least one of trimethoxysilane, methyltriethoxysilane, and dimethyldioxysilane.

In an embodiment, the first solvent is at least one of N-methyl-2-pyrrolidone, N,N-dimethylformamide, N,N-dimethylacetamide, dimethyl, and sulfoxides; the second solvent is at least one of ethanol and polyethylene glycol; and the catalyst is ammonia water.

In an embodiment, the composite solution coated on the support substrate is baked at a temperature of 20 to 80° C. to remove the organic solvent to obtain the thin film layer.

In an embodiment, and the imidization is carried out at a temperature of 350 to 550° C.

In a preferred embodiment, a method for preparing the above composite film is provided, including: providing a support substrate; coating a composite solution on the support substrate under a protective gas atmosphere, and baking the composite solution at a temperature of 20 to 80° C., to remove the organic solvent and obtain a thin film layer; under a protective gas, the film layer is heated to 350-550°

C. to cause imidization of the polyamic acid and hydrolysis of the polysiloxane to obtain a polyimide-silica composite film; and peeling off the support substrate to obtain the composite film, wherein the composite solution is obtained by mixing polyamic acid solution and the polysiloxane solution in a molar ratio of 1:0.1-0.2; and the polyamic acid solution is obtained by a polycondensation reaction of dianhydride and diamine in a molar ratio of 1:0.95-1.05 in a first solvent at a temperature of 10 to 40° C.; while the polysiloxane solution is obtained by a hydrolysis condensation reaction of an alkoxysilane in a second solvent under an action of aqueous ammonia as a catalyst.

In the preferred embodiment, preferably, the dianhydride is at least one of pyromellitic dianhydride, cyclobutane tetracarboxylic dianhydride, benzophenone tetracarboxylic dianhydride, and pyromellitic phthalic anhydride, 4,4'-oxophthalic anhydride; and, the diamine is at least one of 4,4'-biphenyldiamine, 3,4'-diaminodiphenyl ether, and p-phenylenediamine; the first solvent is at least one of N-methyl-2-pyrrolidone, N,N-dimethylformamide, N,N-dimethylacetamide, dimethyl, and sulfoxides; and the second solvent is at least one of ethanol and polyethylene glycol; and the catalyst is ammonia water.

In the above preferred embodiment, preferably, the composite solution coated on the support substrate is baked at a temperature of 20 to 80° C. for 1 to 20 minutes to remove an organic solvent to obtain the thin film layer. In the above preferred embodiment, preferably, the thermal imidization of the thin film is carried out for 0.1 to 1 hour.

The application also provides a display panel including at least one composite film as a flexible substrate.

In the present invention, the polyamic acid is combined with the polysiloxane to obtain the composite solution. Because both the polyamic acid and the polysiloxane are polar polymers, they can be sufficiently mixed. By using the composite solution, a PI-SiO$_2$ composite film structure in which a uniform dense silica layer is formed on the surface of the polyimide film layer can be formed, thereby obtaining a flexible substrate.

During the thermal imidization of the polyamic acid at a high temperature, the polysiloxane in the homogeneous composite solution decomposes due to the increase in temperature, and then transforms into a silica having a regular network structure and gradually migrates to the surface of the polyimide film. Thus, in the composite film of the present invention, a very thin, uniform, and dense silica layer can be formed directly on the surface of the polyimide film layer by a film forming solution. Different from the conventional polyimide substrate used in the prior art and the structure of the silica layer deposited on the polyimide substrate, the composite film described in the present invention is directly formed into the composite film layer structure of PI-SiO$_2$ by a film forming solution. Therefore, the composite film described in the present invention can well avoid problems such as uneven deposition or poor adhesion due to deposition of pure inorganic substances or formation of inorganic materials/binders, and avoid the problems such as an increase in internal stress caused by a surface deposition of the inorganic film and a breakage of the inorganic layer when it is bent.

The composite film of the present invention greatly improves the water-blocking and oxygen barrier properties of the polyimide through the dense silica film formed on the surface while maintaining the original excellent performance of the polyimide. Therefore, the composite film described in the present invention satisfies requirements of flexibility, heat resistance, high water resistance and oxygen barrier properties etc., and can be widely applied to display panels, especially flexible display panels.

BRIEF DESCRIPTION OF DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

DETAILED DESCRIPTION OF PREFERRED EMBODIMENTS

Figure 1A:
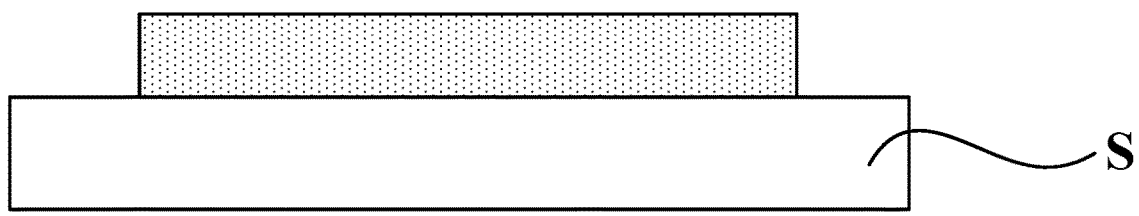
FIGS. 1A and 1B are schematic structural diagrams of a process for preparing a flexible substrate according to an embodiment of the present invention.

With reference to the appended drawings, exemplary embodiments of the present invention will be described in detail below. To aid in understanding the present invention, like numbers refer to like elements throughout the description of the figures, and the description of the same elements will be not reiterated. For illustration clarity, many details of practice are explained in the following descriptions. However, it should be understood that these details of practice do not intend to limit the present disclosure.

The following disclosure provides many different embodiments, or examples, for implementing different features of the invention. Specific examples of components and arrangements are described below to simplify the present disclosure. These are, of course, merely examples and are not intended to be limiting.

In the present invention, the formation of a first feature over or under a second feature in the description that follows may include embodiments in which the first and second features are formed in direct contact, and may also include embodiments in which additional features may be formed between the first and second features, such that the first and second features may not be in direct contact. Moreover, the first feature "above", "over" and "on" the second feature includes the first feature directly above and above the second feature, or merely indicating that the first feature is at a level higher than the second feature. The first feature "below", "under" and "beneath" the second feature includes the first feature directly below and obliquely below the second feature, or merely the first feature has a level lower than the second feature.

The following disclosure provides many different embodiments, or examples, for implementing different features of the invention. Specific examples of components and arrangements are described below to simplify the present disclosure. These are, of course, they are merely examples and are not intended to limit the invention. In addition, the present invention may be repeated with reference to the numerals and/or reference numerals in the various examples, for the purpose of simplicity and clarity, and do not indicate the relationship between the various embodiments and/or arrangements discussed. Moreover, the present invention provides examples of various specific processes and materials, but one of ordinary skill in the art will recognize the use of other processes and/or the use of other materials.

Example 1. Preparation Method of a Composite Film

In this embodiment, a method for preparing a composite film is provided, including the following steps:

1) Preparation of a Composite Solution 1.1) Dianhydride and diamine are dissolved in a polar organic solvent in a molar ratio of 1:0.95-1.05, followed by polycondensation at a temperature of 10 to 40° C. to obtain a precursor of a polyamic acid (PAA) solution.

The dianhydride is at least one of pyromellitic dianhydride, cyclobutane tetracarboxylic dianhydride, benzophenone tetracarboxylic dianhydride, and pyromellitic phthalic anhydride, 4,4'-oxophthalic anhydride; the diamine is at least one of 4,4'-biphenyldiamine, 3,4'-diaminodiphenyl ether, and p-phenylenediamine; and the polar organic solvent is at least one of N-methyl-2-pyrrolidone, N,N-dimethylformamide, N,N-dimethylacetamide, and dimethyl sulfoxide.

1.2) Alkoxysilane is dissolved in the polar organic solvent and ammonia water is added as a catalyst, and a sufficient hydrolysis condensation reaction is carried out at a temperature of 10 to 30° C. to obtain a polysiloxane (PSA) solution.

The alkoxysilane is at least one of methyltrimethoxysilane, methyltriethoxysilane, and dimethyldioxysilane; and the polar organic solvent is ethanol or polyethylene glycol.

1.3) A polyamic acid solution and a polysiloxane solution are mixed in a molar ratio ranging from 1:0.1-0.2 to obtain a uniform composite solution of PAA-PSA.

2) Film Formation at Low Temperature

The composite solution is applied to a support substrate to form a thickness of 50 to 300 μm under a nitrogen atmosphere, and then a film formation reaction is carried out at a temperature of 20 to 80° C. for 1 to 20 minutes to remove the solvent.

3) Thermal Imidization Reaction

A thermal imidation reaction was carried out at a temperature of 350 to 550° C. for 0.1 to 1 hour under a nitrogen atmosphere; and then the film is cooled to room temperature to obtain the composite film.

In this embodiment, a method for preparing a composite film is specifically provided, including the following steps:

1) Preparation of a Composite Solution 1.1) Biphenyltetracarboxylic acid dimethyl anhydride and p-phenylenediamine are dissolved in N-methyl-2-pyrrolidone as a polar organic solvent in a molar ratio of 1:0.95, wherein a total amount of the biphenyltetracarboxylic acid dimethyl anhydride and the p-phenylenediamine is 100 parts by weight, and then a sufficient polycondensation reaction (5 hours) is carried out at a low temperature of 30° C. to obtain a precursor of a polyamic acid (PAA) solution.

1.2) Methyltrimethoxysilane is dissolved in polyethylene glycol as the polar organic solvent, and ammonia water is added as a catalyst, and a sufficient hydrolysis condensation reaction (5 hours) is carried out at a temperature of 10° C. to obtain a polysiloxane (PSA) solution.

1.3) The above polyamic acid solution and a polysiloxane solution are mixed in a molar ratio of 1:0.1 to obtain a uniform composite solution of PAA-PSA.

2) Film Formation at Low Temperature

As shown in FIG. 1A, the above composite solution of PAA-PSA is uniformly coated on a clean and smooth support substrate in a high-purity nitrogen atmosphere, and a wet film having a thickness of 200 μm is baked at a temperature of 40° C. for 20 minutes to remove the polar organic solvent.

3) Thermal Imidization Reaction

Figure 1B:
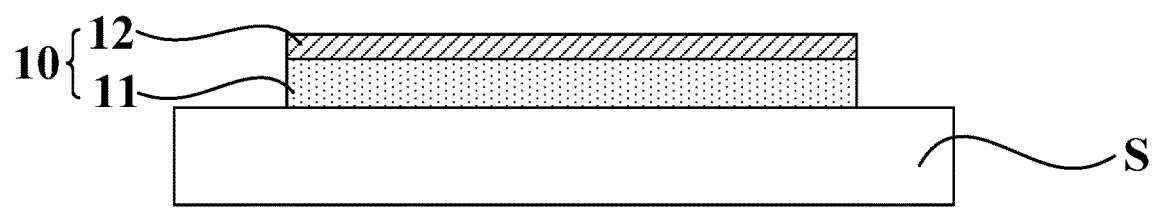

As shown in FIG. 1B, after raising the temperature to 450° C. at a rate of 5° C./min in a high-purity nitrogen atmosphere, the thermal imidization reaction is carried out for 1 hour, and the composite film 10 is obtained after cooling to room temperature.

In the thermal imidization reaction of the step 3), the polysiloxane in the uniform composite solution which forms the wet film decomposes due to an increase in temperature, and then transforms into silica having a regular network structure and gradually migrates to a surface of a polyimide film. Thus, as shown in FIG. 1B, the prepared composite 10 includes a polyimide film layer 11 and a uniform and dense silica layer 12 formed on a surface of the polyimide film layer 11. The uniform and dense silica layer 12 is found to have density of 2.13 g/cm$^3$ and a thickness of 400 nm after an experimental test.

Example 2. Preparation Method of Composite Film A

In this embodiment, a method for preparing a composite film is specifically provided, including the following steps:

1) Preparation of a Composite Solution 1.1) Pyromellitic dianhydride and 4,4'-biphenyldiamine are dissolved in N-methyl-2-pyrrolidone as a polar organic solvent in a molar ratio of 1:0.95, wherein a total amount of the pyromellitic dianhydride and 4,4'-biphenyldiamine is 100 parts by weight, and then a sufficient polycondensation reaction (8 hours) is carried out at a low temperature of 20° C. to obtain a precursor of a polyamic acid (PAA) solution.

1.2) Methyltrimethoxysilane is dissolved in polyethylene glycol as a polar organic solvent, and ammonia water is added as a catalyst, and then a sufficient hydrolysis condensation reaction (3 hours) is carried out at a temperature of 20° C. to obtain a polysiloxane (PSA) solution.

1.3) The above polyamic acid solution and polysiloxane solution are mixed in a molar ratio of 1:0.15 to obtain a uniform composite solution of PAA-PSA.

2) Film Formation at Low Temperature

Similar to Example 1, the above composite solution of PAA-PSA is uniformly coated on a clean and smooth support substrate in a high-purity nitrogen atmosphere, and the wet film having a thickness of 300 μm is baked at a temperature of 60° C. for 10 minutes to remove the polar organic solvent.

3) Thermal Imidization Reaction

Similar to Example 1, after raising the temperature to 500° C. at a rate of 10° C./min in a high-purity nitrogen atmosphere, the thermal imidization reaction is carried out for 0.2 hours, and after the film is cooled to room temperature, the composite film A is obtained. The uniform and dense silica layer 12 in the composite film A was found to have a density of 2.8 g/cm$^3$ and a thickness of 500 nm after an experimental test.

Example 3. Preparation Method of Composite Film B

In this embodiment, a method for preparing a composite film is specifically provided, including the following steps:

1) Preparation of a Composite Solution 1.1) Cyclobutane tetracarboxylic dianhydride and p-phenylenediamine are dissolved in N,N-dimethylformamide as a polar organic solvent in a molar ratio of 1:1, wherein a total amount of the cyclobutane tetracarboxylic dianhydride and p-phenylenediamine is 100 parts by weight, and a sufficient polycondensation reaction (2 hours) is then carried out at a low temperature of 40° C. to obtain a precursor of a polyamic acid (PAA) solution.

1.2) Dimethyldioxysilane is dissolved in ethanol as a polar organic solvent, and ammonia water is added as a catalyst, and a sufficient hydrolysis condensation reaction (1 hour) is then carried out at a temperature of 30° C. to obtain a polysiloxane (PSA) solution;

1.3) The above polyamic acid solution and polysiloxane solution are mixed in a molar ratio of 1:0.2 to obtain a uniform composite solution of PAA-PSA.

2) Film Formation at Low Temperature

Similar to Example 1, the above composite solution of PAA-PSA is uniformly coated on a clean and smooth support substrate in a high-purity nitrogen atmosphere, and the wet film having a thickness of 50 μm is baked at a temperature of 20° C. for 20 minutes to remove the polar organic solvent.

3) Thermal Imidization Reaction

Similarly to Example 1, after raising the temperature to 350° C. at a rate of 10° C./min in a high-purity nitrogen atmosphere, the thermal imidization reaction is carried out for 1 hour, and the composite film B is obtained after cooling to room temperature. The dense silica layer in the composite film B was found to have a density of 2.2 g/cm$^3$ and a thickness of 20 nm after an experimental test.

Example 4. Preparation Method of Composite Film C

In this embodiment, a method for preparing a composite film is specifically provided, including the following steps:

1) Preparation of a Composite Solution 1.1) Benzophenone tetracarboxylic dianhydride and 3,4'-diaminodiphenyl ether are dissolved in N,N-dimethylformamide as a polar organic solvent in a molar ratio of 1:1.05, wherein a total amount of the benzophenone tetracarboxylic dianhydride and 3,4'-diaminodiphenyl ether is 100 parts by weight, and a sufficient polycondensation reaction (10 hours) is then carried out at a low temperature of 10° C. to obtain a precursor of a polyamic acid (PAA) solution.

1.2) Dimethyldioxysilane in polyethylene glycol as a polar organic solvent, and ammonia water is added as a catalyst, and a sufficient hydrolysis condensation reaction (5 hours) is then carried out at a temperature of 10° C. to obtain a polysiloxane (PSA) solution;

1.3) The above polyamic acid solution and polysiloxane solution are mixed in a molar ratio of 1:0.1 to obtain a uniform composite solution of PAA-PSA.

2) Film Formation at Low Temperature

Similar to Example 1, the above composite solution of PAA-PSA is uniformly coated on a clean and smooth support substrate in a high-purity nitrogen atmosphere, and the wet film having a thickness of 250 μm is baked at a temperature of 40° C. for 10 minutes to remove the polar organic solvent.

3) Thermal Imidization Reaction

Similarly to Example 1, after raising the temperature to 400° C. at a rate of 10° C./min in a high-purity nitrogen atmosphere, the thermal imidization reaction is carried out for 0.8 hours, and after the film is cooled to room temperature, the composite film C is obtained. The uniform and dense silica layer in the composite film C was found to have a density of 2.5 g/cm$^3$ and a thickness of 150 nm after an experimental test.

Example 5. Preparation Method of Composite Film D

In this embodiment, a method for preparing a composite film is specifically provided, including the following steps:

1) Preparation of a Composite Solution 1.1) 4,4'-oxophthalic anhydride and 3,4'-diaminodiphenyl ether are dissolved in dimethyl sulfoxide as a polar organic solvent in a molar ratio of 1:1, wherein a total amount of the 4,4'-oxophthalic anhydride and 3,4'-diaminodiphenyl ether is 100 parts by weight, and a sufficient polycondensation reaction (10 hours) is then carried out at a low temperature of 10° C. to obtain a precursor of a polyamic acid (PAA) solution;

1.2) Methyltriethoxysilane is dissolved in polyethylene glycol as a polar organic solvent, and ammonia water is added as a catalyst, and a sufficient hydrolysis condensation reaction (4 hours) is then carried out at a temperature of 25° C. to obtain a polysiloxane (PSA) solution;

1.3) The above polyamic acid solution and polysiloxane solution are mixed in a molar ratio of 1:0.1 to obtain a uniform composite solution of PAA-PSA;

2) Film Formation at Low Temperature

Similar to Example 1, the above composite solution of PAA-PSA is uniformly coated on a clean and smooth support substrate in a high-purity nitrogen atmosphere with a wet film thickness of 150 μm and baked at a temperature of 80° C. for 1 minute to remove the polar organic solvent;

3) Thermal Imidization Reaction

Similarly to Example 1, after raising the temperature to 550° C. at a rate of 20° C./min in a high-purity nitrogen atmosphere, the thermal imidization reaction is carried out for 0.1 hour, and after the film is cooled to room temperature, the composite film D is obtained. The dense silica layer in the composite film D was found to have a density of 2.0 g/cm$^3$ and a thickness of 10 nm after an experimental test.

Example 6. Preparation Method of Composite Film E

In this embodiment, a method for preparing a composite film is specifically provided, including the following steps:

1) Preparation of a Composite Solution 1.1) Biphenyltetracarboxylic acid dimethyl anhydride and p-phenylenediamine are dissolved in -methyl-2-pyrrolidone as a polar organic solvent in a molar ratio of 1:1.05, wherein a total amount of the biphenyltetracarboxylic acid dimethyl anhydride and the p-phenylenediamine is 100 parts by weight, and a sufficient polycondensation reaction (8 hours) is then carried out at a low temperature of 25° C. to obtain a precursor of a polyamic acid (PAA) solution.

1.2) Methyltrimethoxysilane is dissolved in polyethylene glycol as a polar organic solvent, and ammonia water is added as a catalyst, and a sufficient hydrolysis condensation reaction (4 hours) is then carried out at a temperature of 25° C. to obtain a polysiloxane (PSA) solution;

1.3) The above polyamic acid solution and polysiloxane solution are mixed in a molar ratio of 1:0.2 to obtain a uniform composite solution of PAA-PSA.

2) Film Formation at Low Temperature

Similar to Example 1, the above composite solution of PAA-PSA is uniformly coated on a clean and smooth support substrate in a high-purity nitrogen atmosphere, and the wet film having a thickness of 100 μm is baked at a temperature of 30° C. for 7 minutes to remove the polar organic solvent.

3) Thermal Imidization Reaction

Similarly to Example 1, after raising the temperature to 350° C. at a rate of 5° C./min in a high-purity nitrogen atmosphere, the thermal imidization reaction is carried out for 0.1 hour, and after the film is cooled to room temperature, the composite film E is obtained. The uniform and dense silica layer in the composite film E was found to have a density of 3.0 g/cm$^3$ and a thickness of 200 nm after an experimental test.

Embodiment 7. Display Panel

Figure 2:
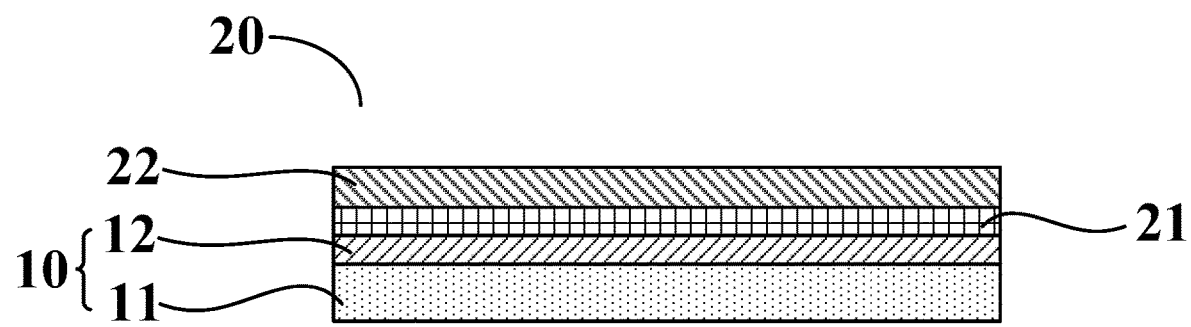
FIG. 2 is a schematic structural diagram of a display panel according to an embodiment of the present invention.

As shown in FIG. 2, an embodiment of the present invention also provides a display panel 20 using the above composite film 10 as a flexible substrate, and the display panel also includes a thin film transistor layer 21 formed on the composite film 10, and an organic light emitting device layer 22 formed on the thin film transistor layer 21. Of course, the display panel 20 may also include other structures of display panels known in the art, such as a package cover plate.

While the invention has been described by way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

The main body of the present invention can be manufactured and used in the industry, and has industrial applicability.

What is claimed is:

1. A composite film, comprising a polyimide film and a dense silica layer formed on a surface of the polyimide film, wherein the dense silica layer has density ranging from 2.8 g/cm$^3$ to 3 g/cm$^3$, and a thickness ranging from 10 to 500 nm.

2. The composite film according to claim 1, wherein the composite film has a thickness ranging from 50 to 300 μm.

3. A composite film, comprising a base substrate and a dense silica layer formed on a surface of the base substrate, wherein the dense silica layer has density ranging from 2.8 g/cm$^3$ to 3 g/cm$^3$.

* * * * *